Fig. 1.

INVENTOR
William L. Barclay, Jr.

Patented Apr. 28, 1953

2,637,008

UNITED STATES PATENT OFFICE 2,637,008

DYNAMIC-BRAKING CONTROL

William L. Barclay, Jr., Scarsdale, N. Y., assignor to Westinghouse Electric Corporation, East Pittsburgh, Pa., a corporation of Pennsylvania Application March 6, 1952, Serial No. 275,187

13 Claims. (Cl. 318—274)

My invention relates to direct-current electrically propelled railway-vehicles, and it has particular relation to electrical control-systems therefor, in which provision is made for dynamic braking. My invention is an improvement over the type of control which is shown in the Riley and Purifoy Patent 2,523,143, granted September 19, 1950; an application of Lynn G. Riley, Serial No. 95,904, filed May 28, 1949, now Patent No. 2,597,183; and an application of John E. Drake, Serial No. 258,712, filed November 28, 1951.

Proper control of the buildup of dynamic braking depends upon the previous continuous circulation of a weak braking-current in the dynamic-braking circuit during coasting, before braking is applied. This current during coasting is called spotting current. On rapid-transit cars to which my present invention is applicable, difficulties have been experienced, with the equipment as originally supplied (before my present improvements), because of a severe surge when the brake is applied after coasting. The over-shooting of the braking-current is, in turn, caused by the previous system of spotting-control, which permitted some of the resistance-shorting switches to close, in the course of spotting-current adjustment during the coasting period, thus reducing the amount of resistance which is initially included in the braking circuit at the moment when braking is first applied. Excessive motor-current and voltage, during the buildup of dynamic braking, results in rough braking and in motor-flashing.

My new system of spotting-control involves alternately increasing and decreasing the excitation of the traction-motors, during the spotting operation, while maintaining the maximum resistance in the braking-circuit. During an extended continuance of the operation of my spotting-current control-means, that is, during an extended coasting-period, my control-apparatus responds to repetitive momentary low-current responses of the spotting-controlling limit-relay, by repetitively giving the field-controlling means momentary adjustments toward a full-field condition. As soon as the motor-field begins to strengthen, the spotting-current increases, so that the limit-relay is changed from its low-current-responsive condition to its acceptable-current condition, and the field-increasing impulse is discontinued; that is, the field-controlling means is adjusted to or toward its short-field condition. According to my invention, however, the momentary field-increasing increments are in such strength that a considerable time will be required for the field-strength of the motor to die down again to a value which will produce another low-current response of the spotting-control limit-relay. This process will be continued repeatedly, with the time-intervals automatically adjusting themselves according to the train-speed, that is, the motor-speed, so that the average or effective motor field-strength will be maintained at whatever value is necessary, in order to maintain a desired value of the spotting-current.

During this spotting-current adjustment, the braking-circuit resistance is maintained at its maximum value. The result is, therefore, that when dynamic braking is called for, after a period of coasting or spotting-current control, all of the braking-circuit resistance will be initially in service, when the motor field-strength is increased in response to the initiation of dynamic braking, thus cushioning the initial surge of braking-current, which has been so troublesome with the equipment as previously provided. Thus, instead of an initial fast buildup of the braking current to a value above the correct braking-current, as has previously been encountered, my present invention provides for a cushioned buildup of the braking-current, involving first a progressive increase in the field-strength of the motor or motors, and then a progressive decrease in the resistance in the braking-circuit or circuits, these progressive operations requiring sufficient time to delay the buildingup-characteristic enough to avoid any "bump" or rough braking, or any motor-flashing.

With the foregoing and other objects in view, my invention consists in the circuits, systems, apparatus, combinations, parts, and methods of design and operation, hereinafter described and claimed, and illustrated in the accompanying drawing, wherein:

Figure 1:
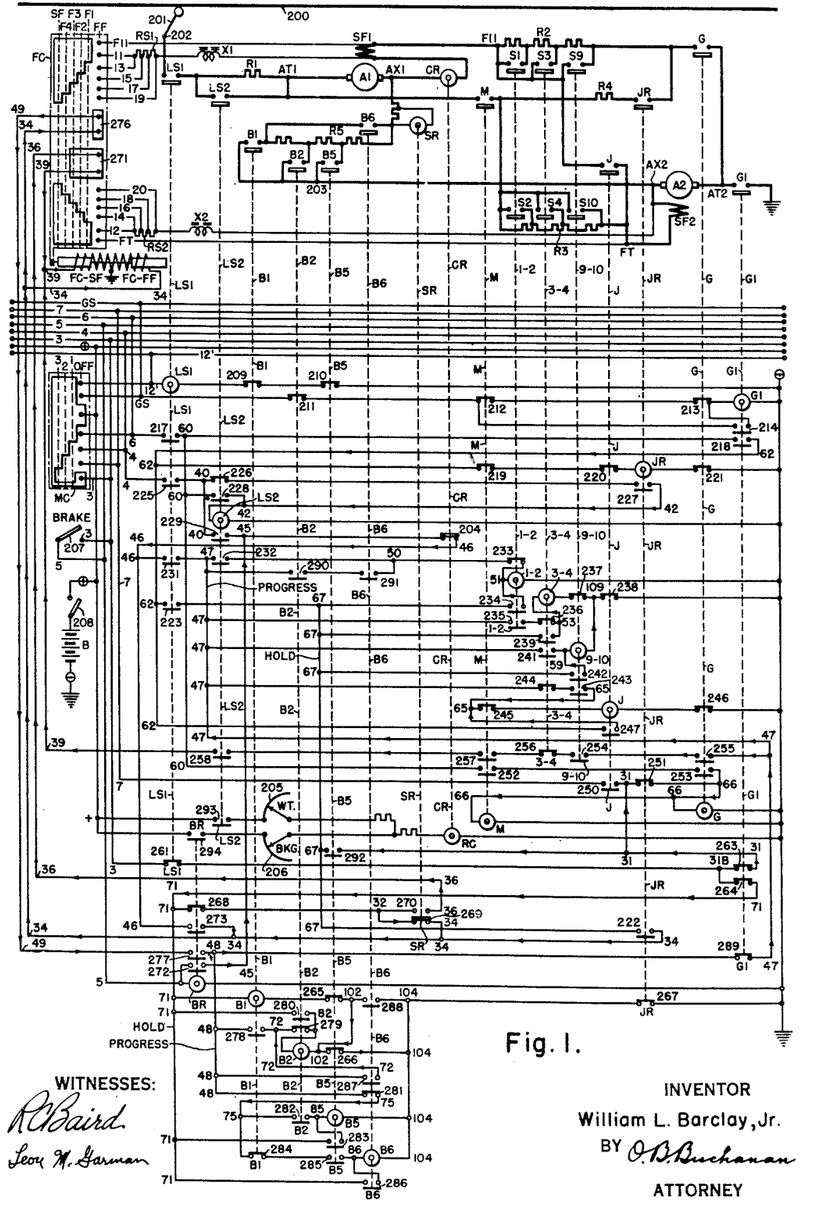
Figure 1 is a simplified circuit-diagram of the parts of one car, which are necessary to illustrate my present invention, omitting many parts which are known to be needed in a successful railway-control equipment of the type to which my invention is applied, but which are not necessary to be discussed in setting forth the nature and operation of my present improvements.
Figure 2:
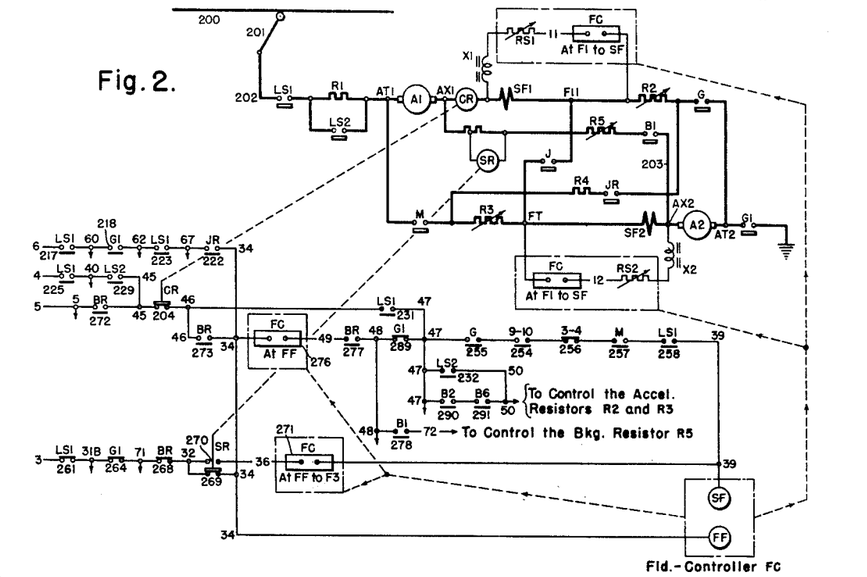
Fig. 2 is a fragmentary schematic, or across-the-line diagram, of the novel features of my present invention, and enough of the other equipment to show the setting of the invention and the operation of its essential or generic features.

Fig. 1 represents some of the equipment which is carried by a single electrically propelled railway-car embodying my invention. Direct-current power is supplied to the car from a trolley-wire 200, or a third rail, which is engaged by a trolley-pole 201, or a third-rail shoe or other current-collecting equipment, carried by the car. The trolley-pole 201 energizes a line 202 which constitutes a supply-circuit for the car. The traction-motors for the car are series motors, which are indicated, by way of a simple example, in Fig. 1, as comprising two motor-armatures A1 and A2, each being associated with its own series field winding SF1 and SF2, respectively, the ordinary reversing-switches being omitted for the sake of simplicity. Two series-motor means, or circuits, are shown. The first series-motor means comprises, in series, an armature-terminal AT1, a motor-armature or armatures A1, an intermediate connection-point AX1, a series field winding or windings SF1, for supplying the field-excitation for said armature or armatures, and a field-terminal F11. The corresponding parts for the second series-motor means are indicated at AT2, A2, AX2, SF2, and FT.

A series-parallel motor-control arrangement is shown in Fig. 1, in which a line-switch or relay LS1 and a ground-switch G1 are used as power-switch means for establishing a power-circuit for energizing the motors, by connecting the first armature-terminal AT1 to the supply-circuit 202, and connecting the second armature-terminal AT2 to ground. For completing the series-circuit connections, a switch JR is closed in addition to the power-switches LS1 and G1. For parallel-motor operation, two switches M and G are closed in addition to the power-switches LS1 and G1. The parallel-motor switch M provides a circuit-connection between the armature-terminal AT1 of one series-motor means and the field-terminal FT of the other series-motor means; while the other parallel-motor switch G provides a circuit-connection between the other armature-terminal AT2 and the other field-terminal F11. During an intermediate transition-period, a switch J is closed. These motor-controlling connections are all in accordance with a well-known switching-system.

Dynamic-braking circuits are established by opening the two power-switches LS1 and G1 and closing a braking-switch B1 in addition to the two parallel-connection switches M and G, also in accordance with a well-known system or arrangement. The braking-switch B1 provides a common dynamic-braking circuit-connection 203 between the respective intermediate connection-points AX1 and AX2 of the two series-motor means, thus providing two dynamic-braking circuits wherein the motor-armature or armatures of each of said series-motor means are loaded by the field winding or windings of the other one of said series-motor means, respectively.

A suitable number of series-connected accelerating resistances are used, as indicated at R1, R2, R3 and R4. The resistance R1 is disposed between the supply-line 202 and the first armature-terminal AT1, and is shorted out by means of a second line-switch LS2. The resistance R2 is in series with the first field-terminal F11, and is progressively shorted out by means of switch-contacts S1, S3 and S9. The resistance R3 is in series with the second field-terminal FT, and is progressively shorted out by switch-contacts S2, S4 and S10. The resistance R4 is in the series-motor connection which is made by the switch JR, and this resistance is finally shorted out by the transition-switch J, for obtaining the full-series power-circuit connection of the motors. During parallel motor operation, the switch-contacts S3, S4 and S9, S10 are successively or progressively closed, during the acceleration of the motor, and after all of the accelerating-resistances R2 and R3 have been cut out, the field-strengths of the motors are progressively reduced, to provide short-field operating-conditions.

In accordance with a usual arrangement, the motor-fields are reduced by equipping each of the series field windings SF1 and SF2 with a field-shunt, comprising an inductive reactor X1 or X2, as the case may be, and a variable resistor RS1 and RS2, respectively. The field-shunts X1—RS1 and X2—RS2 are first connected in parallel relation to their respective field-windings SF1 and SF2, by means of contact-terminals 11 and 12 respectively of a progressively or sequentially operating field-controlling means, which is herein illustrated as an electrically operated drum-type field-controller FC. After the respective field-shunts have been connected into operation, the field-shunt resistances RS1 and RS2 are then progressively shorted out by successive controller-points 13, 15, 17 and 19, for RS1, and 14, 16, 18 and 20, for RS2, as the field-controller FC is moved from its initial full-field position FF, through its intermediate positions F1, F2, F3 and F4 to its short-field position SF, at which point the field-winding currents are reduced to about fifty per cent of their unshunted values.

During dynamic braking, the two motors are connected by the common dynamic-braking circuit-connection 203, which contains the braking-switch B1 and a braking-resistance R5. This resistance R5 is used, in addition to the previously mentioned accelerating-resistances R2 and R3, in establishing the complete dynamic-braking circuit. The braking-resistance R5 is progressively shorted out by means of braking-switches B2, B5 and B6, during dynamic-braking operations, after which the acceleration-resistances R2 and R3, or portions thereof, are progressively shorted out, as by the switch-contacts S3, S4, and S9, S10. (The switch contacts S1 and S2 are permanently closed during the dynamic-braking operations, in the illustrated system.)

The progressive operation of the various resistance-shorting switches, during both motoring operation and dynamic braking, is under the automatic control of a suitable limit-relay or relays, which are energized to be responsive to conditions which accompany excessive torque in the motors. Such a limit-relay is illustrated in the form of a current-relay CR, having an actuating-coil CR which is connected in series-circuit relation between the intermediate connection-point AX1 and the series field winding SF1. This current-relay CR also has a back-contact 204 (also marked CR), which is normally closed, that is, which is closed in the non-actuated or low-current position of the relay.

The current-relay CR is also provided with certain recalibrating-means. In accordance with previous practice, this relay is provided with a cumulatively operating rate-coil RC, which is energized through a weight-responsive rheostat 205, during accelerating operations, and which is energized through a braking-responsive rheostat 206 during dynamic-braking conditions. The weight-responsive rheostat 205 is automatically adjusted according to the variable weight or live load carried by the car, so that the rate-coil RC is the most strongly excited during light-load conditions, thus reducing the minimum-current setting at which the limit-relay CR picks up and opens its back-contact 204. The braking-responsive rheostat 206 is automatically changed in response to the position of the brake-handle 207, so that the rate-coil RC has its maximum excitation when a low braking-rate is called for, thus providing a low minimum-current setting at which the limit-relay CR picks up and opens its back contact 204.

All of the electrically controlled relays and switches which are shown in Fig. 1 are diagrammatically indicated as having vertical switch-stems (indicated by dotted lines) which are biased by gravity toward their lowermost positions, and all of these switches and relays are shown, in Fig. 1, in their deenergized or nonactuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The various electrical control-circuits for the train are under the control of a number of train-line wires, which extend from car to car, throughout the entire length of the train. In the simplified circuit-diagram of Fig. 1, eight of these train-line wires are indicated, being given their usual designations, namely (+), 3, 4, 5, 6, 7, 12' and GS.

Energy for the various relay-circuits is provided by means of a battery B on each car. The negative terminal (—) of each battery is permanently grounded, while the positive terminal of each battery is connected, through a switch 208, to the positive train-line wire (+).

Each end of each car is provided with a motorman's master controller MC, only one of which is indicated in Fig. 1. The illustrated master controller MC is indicated as being an accelerating-controller having an off-position and three on-positions 1, 2 and 3. In each of the three on-positions of the master-controller MC, the positive control-wire (+) is connected to the train-line wires 12', GS and 6. The train-line wire 12' is the energizing-wire for the operating-coil LS1 of the line-switch LS1; while the train-line wire GS is the energizing-wire for the operating-coil G1 of the ground-switch G1, as will be subsequently described.

In the second and third on-positions of the accelerating-drum of the master controller MC, the train-line wire 4 is energized from the positive bus (+); while in the third on-position of this controller, the train-line wire 7 is energized from the positive bus (+).

In the off-position of the accelerating drum or master controller MC, a connection is made from the positive control-wire (+) to the train-line wire 3. In the master controller MC, in accordance with a known practice, there is an overlap between the off-position contact which energizes this conductor 3, and the on-position contacts which energize the conductors 12' and GS, so that, during the notching-off of the master-controller MC, the contact at 3 is made before the contact or contacts at 12' and GS are broken.

Figure 3:
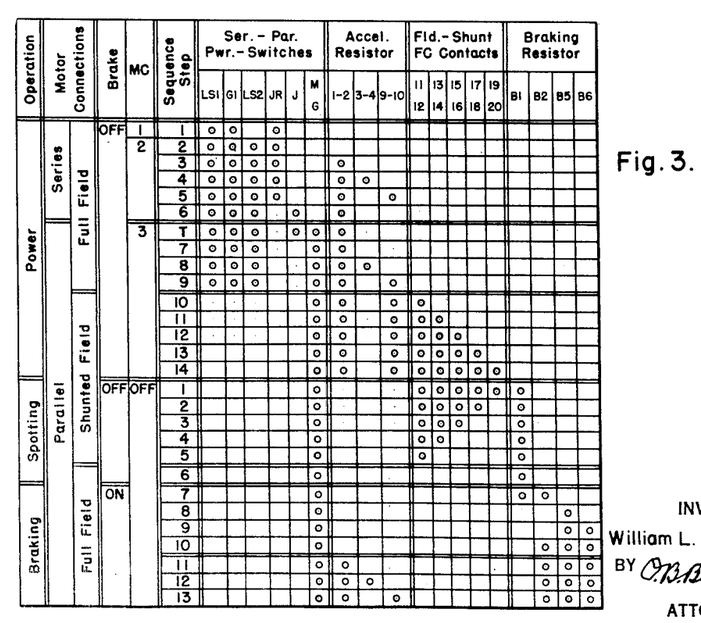
Fig. 3 is a sequence-chart.

The circuits and the operations, under the control of the various control-wires 12', GS, 6, 4, 7, 3 and 5, are best described together, with special emphasis on the novel features of my present invention. Reference may be made to the previously mentioned copending Riley application, and also to the previously mentioned Riley and Purifoy Patent 2,523,143, granted September 19, 1950, for further explanations of previously known features with which my present invention cooperates. Reference may also be had to Fig. 3 of the accompanying drawings, which shows the sequence of the switching operations.

The first on-position of the accelerating-controller MC, in Fig. 1, is a switching position, in which the control-wires 12', GS, and 6 are all energized. The control-wire 12' energizes the operating-coil LS1 of the line-switch LS1, through interlocks which are provided, by the braking-switches B1 and B5, in the form of back-contacts 209 and 210, respectively.

The train-line wire GS energizes the operating-coil G1 of the ground-switch G1, through interlocks which are provided, by the braking-switch B2 and the parallel-operation switches M and G, in the form of back-contacts 211, 212, and 213 respectively; and this ground-switch G1 is provided with a make-contact 216 which bypasses the M and G interlocks 212 and 213.

The train-line wire 6 is connected, through an LS1 make-contact 217, to a relay-circuit 60, which is connected, through a G1 make-contact 218, to a circuit 62 which constitutes a hold-circuit for the switch-progression for the accelerating-resistance short-circuiting switches S1 to S10 and J. This hold-circuit 62 is used to energize the operating coil JR of the series-motor-circuit switch JR, through interlocks on the switches M, J and G, in the form of back-contacts 219, 220, and 221, respectively.

The result of the master-control energizations, in the No. 1 on-position of the master-controller MC, is thus to close the main-circuit or power-circuit contacts of the traction-motor switches LS1, G1 and JR, thereby completing a series-connection motor-circuit for causing a slow movement of the train, for so-called "switching" purposes, with all of the accelerating-resistances in series with the motors. This circuit can be traced from the supply-circuit 202, through the main LS1 contact, the resistor R1, the armature A1, the current-relay coil CR, the series field SF1, the resistance R2, the main JR contact, the resistance R4, the resistance R3, the series field SF2, the motor armature A2, and the main G1 contact, to ground.

The energization of the series-connection switch JR closes a JR make-contact 222 which energizes the full-field wire 34 of the field-controller FC, from a hold-circuit 67, which is connected to the previously described hold-circuit 62 through an LS1 make-contact 223.

The full-field wire 34 of the field-controller FC energizes a full-field coil FC—FF, or other means for causing the field controller FC to move or progress from its short-field position SF to its full-field position FF. This energization of the full-field coil FC—FF in response to an actuation of the series-connection switch JR thus assures that the field-controller FC is in its full-field position FF during the series-connection operation of the traction-motors.

The No. 2 position of the accelerating-controller MC energizes the train-line wire 4, which is connected, through an LS1 make-contact 225, to a conductor 40. The conductor 40 is connected, through an LS2 back-contact 226, and a JR make-contact 227, to a conductor 42, which energizes the operating-coil LS2 of the second line-switch LS2, which short-circuits the first accelerating-resistor R1. This LS2 switch has a make-contact 228 which picks up and serves as a holding-circuit contact between the circuits 60 and 42.

This second line-switch LS2 also has a make-contact 229 which conects the circuit 40 to a circuit 45, which is connected, through the CR limit-relay back-contact 204, to a circuit 46 which constitutes the main limit-relay progression-circuit of the control-equipment. This limit-relay progression-circuit 46 must be energized before there can be any progression during either the motoring operation or the braking operation.

This limit-relay progression-circuit 46 is connected, through an LS1 make-contact 231, to a progression-wire 47, which is connected through an LS2 make-contact 232 to a control-wire 50. The control-wire 50 energizes the operating-coil 1—2 for a resistor-shorting progression-switch which carries the two main contacts S1 and S2, this energization being effected through a back-contact 233 of this same switch 1—2. Thus, this energizing-circuit from the conductor 50 includes the switch-out interlock 233, a conductor 51, and the coil 1—2. The switch 1—2 picks up and closes a holding-circuit make-contact 234, which energizes the circuit 51 from the hold-circuit 67.

The actuation of the resistance-shorting switch 1—2 also closes a make-contact 235, which energizes a circuit 53 from the progression-circuit 47, through a back-contact 236 of a resistance-shorting switch 3—4, which is the switch which carries the main switching-contacts S3 and S4. The energizing circuit for this switch extends from the conductor 53, through the operating coil 3—4 and a back-contact 237 of a resistance-shorting switch 9—10, thence through a control-circuit conductor 109, and a J-switch back-contact 238, to the grounded negative battery-terminal (—). The actuation of the resistance-shorting switch 3—4 closes a make-contact 239 which establishes a holding-circuit for the conductor 53 from the hold-wire 67.

The actuation of the progression-switch 3—4 also closes a make-contact 241, which completes a circuit from the progression-wire 47 to a conductor 59, which energizes the actuating coil 9—10 of the resistance-shorting switch which carries the main switch-contacts S9 and S10, the negative terminal of said coil 9—10 being connected to the previously described wire 109. The actuation of the switch 9—10 closes a make-contact 242 which establishes a holding-circuit for the conductor 59 from the hold-wire 67.

The actuation of the resistance-shorting switch 9—10 also closes a make-contact 243, which is connected between the progression-wire 47, a back-contact 244 of the resistance-shorting switch 3—4, and a circuit 65, thus energizing the operating-coil J of the transition-switch J, through the M and G back-contacts 245 and 246, respectively. The transition-switch J then closes its main or power-circuit contact J, which constitutes the last step in the series motor-connection for the traction-motors, cutting out the last accelerating-resisance R4. This transition-switch J has a make-contact 247 which establishes a holding-circuit from the conductor 65 back to the hold-line 62. The previously described J-switch back-contacts 220 and 238 are opened, upon the energization of the transition-switch J, thus dropping out the initial series-connection switch JR, and the accelerating-switches 3—4 and 9—10.

The next step in the acceleration of the traction-motors is accomplished by a movement of the master-controller MC to its No. 3 position, which energizes the train-line wire 7. This train-wire 7 is connected, through a make-contact 250 of the transition-switch J, so as to energize a control-circuit 31, which is in turn connected, through a JR back-contact 251, to a control-circuit 66 which energizes the operating coils M and G of the parallel-motor-connection switches M and G. These switches M and G thereupon connect the traction-motors in parallel, between the supply-circuit 202 and ground, with only two of the resistance-shorting switches energized, namely the second line-switch LS2, and the switch 1—2 which carries the main switching-contacts S1 and S2. The energization of the parallel-connection switches M and G opens the previously described back-contacts 245 and 246, respectively, which drop out the transition-switch J. The energization of these M and G switches also closes their make-contacts 252 and 253, respectively, which establish a holding-circuit for the conductor 66 from the line 60.

Responsive to the dropping-out of the transition-switch J, the back-contact 238 of this switch recloses, and re-initiates the switch-progression of the resistance-shorting contacts S3 to S10, under the control of the switches 3—4 and 9—10, through the circuits which have been previously described. This establishes the maximum armature-voltage conditions on the motors, and it completes the connections for the full-field parallel-connection operation of the traction-motors, as indicated also in the sequence-chart of Fig. 3.

As soon as the last resistance-shorting switch 9—10 closes, it closes an additional contact 254, which energizes a field-controller-actuating circuit from the progress-wire 47, said circuit extending from the wire 47 through a make-contact 255 of the parallel-connection switch G, the aforesaid contact 254 of the resistance-shorting switch 9—10, a back-contact 256 of the resistance-shorting switch 3—4, make-contact 257 of the parallel-connection switch M, and a make-contact 258 of the line-switch LS2, and thence to the short-field wire 39 of the field-controller FC.

The short-field wire 39 of the field-controller FC energizes the short-field coil FC—SF, or other means which may be used to move the field-controller from its full-field position FF to its short-field position SF. This starts the progressive operation of the field-controller, and it may be brought about in any one of several ways. In the illustrated form of embodiment, since the control-power for the short-field wire 39 is obtained from the progress-wire 47, which is under the control of the CR limit-relay contact 204, the field-weakening progression of the field-controller FC is interrupted whentver the motor-current is above its predetermined minimum value, for which the limit-relay CR is set. This completes the connections for the short-field parallel-connection operation of the traction-motors, thus completing the acceleration-progression, as indicated in the sequence-chart of Fig. 3.

If, now, the master-controller MC is returned to its off-position, the car or train being now running at some speed, the master-controller will energize the train-line wire 3, which may be described as the brake-wire 3, because it is used to set up the dynamic-braking circuits for the motors during the coasting operation.

The brake-wire 3 is connected, through an LS1 back-contact 261, to a control-circuit 31B. This control-circuit 31B is connected, through a G1 back-contact 263, to the previously described control-circuit wire 31, which energizes the previously described parallel-motoring switches M and G through the JR back-contact 251 and the control-wire 66. The control-conductor 31B is also connected, through a G1 back-contact 264, to a braking-operation hold-wire 71, which is connected to the positive terminal of the braking-switch coil B1, the negative terminal of which is connected in a circuit which includes a B5 back-contact 265, a conductor 102, another B5 back-contact 266, a conductor 104, and a JR back-contact 267, and thence to the grounded negative battery-terminal (−). The closure of the switches M, G and B1 completes the establishment of a weak coasting-operation dynamic-braking circuit-connection for the traction-motors, with all of the available dynamic-braking resistances R5, R2 and R3 in circuit, this dynamic-braking resistance being large enough so that the braking tractive-effort is usually quite weak, at moderate motor-speeds, thus permitting the train to coast, with little or no sensible or perceptible braking-effect, as long as the field-controller FC remains in its short-field position.

A connection is also provided, for controlling the field-controller FC during the coasting-operation. Thus, I provide a circuit extending from the braking-operation hold-wire 71, through a back-contact 268 of a brake-relay BR, to a control-circuit 32, and thence through the back-contact 269 of a spotting-relay SR, to the full-field wire 34 of the field-controller FC. The brake-relay BR was shown and described in the previously mentioned Riley and Purifoy patent, and its energizing-circuit will be referred to hereinafter. The spotting relay SR is a previously used relay, having an operating-coil SR which is included in the common brake-circuit connection 203, so that this relay is responsive to the braking-circuit. This spotting-relay SR is adjusted to have a low-current pickup-value, so that it can hold the braking-current to a small value suitable for spotting purposes, during the coasting operation of the traction-motors, as is well understood in the art.

In accordance with a known control-method, the spotting-relay SR has a make-contact 270 which connects the circuit 32 to a circuit 36, which goes to a field-controller contact-segment 271, which is closed only during certain early points in the progressive movement of the field-controller FC from its full-field position FF toward its short-field position SF. This field-controller segment 271 is preferably opened at a certain point near the short-field position SF, preferably before the field-controller reaches this short-field position SF. As shown, I prefer to have this field-controller segment 271 closed at the positions FF through F3 of the field-controller FC. This field-controller segment 271 is used to connect the wire 36 to the short-field wire 39 of the field-controller FC. In this way, when the spotting current is too large, that is, large enough to pick up the spotting-relay SR, the spotting-current is reduced by adjusting the motor-fields toward a weaker condition, by making the field-controller FC progress in the direction towards its short-field position, but this progression is usually arrested before the field-controller returns all of the way back to its original short-field position SF, which it occupied before the spotting-control commenced to operate.

A service braking-application is made by the closure of the brake-lever 207, which energizes the full-brake wire 5 from the brake-wire 3. This full-brake wire 5 is connected directly to the coil BR of the brake-relay BR. This brake-relay BR has a make-contact 272, which connects the full-brake line 5 to the conductor 45 which leads up to the limit-relay progression-circuit 46, thus putting the braking progression under the control of the back-contact 204 of the limit-relay or current-relay CR, which is in circuit between the conductor 45 and the limit-relay progression-circuit 46.

Whenever a braking-application is called for, the energization of the brake relay BR closes a BR make-contact 273, which is used in the initiation of the dynamic-braking progression. Thus, the BR make-contact 273 makes a connection from the limit-relay progression-circuit 46 to the full-field wire 34 of the field-controller FC. This causes a progression of the field-controller FC until it reaches its full-field position FF, under the control of the limit relay CR, which controls the energization of the limit-relay progression-circuit 46.

When the braking-controlling progression has proceeded to the point at which full-field conditions are restored in the traction-motors, the field-controller FC closes a full-field contact-member 276, which closes a circuit from the full-field wire 34 to a conductor 49, and thence through a BR make-contact 277 to a braking-progression circuit 48.

The energization of the braking-circuit progression-wire 48 immediately serves, through a B1 make-contact 278, which is already closed, to energize a circuit 72, which is connected, through a B2 back-contact 279, to a circuit 82 which is connected to the positive terminal of the B2 actuating-coil, the negative terminal of which is connected to the previously described conductor 102. The B2 switch thus picks up and closes its main contact B2 which shorts out a part of the braking-resistance R5 in the common dynamic-braking circuit 203 of the traction-motors. The actuation of the B2 switch closes a make-contact 280 which establishes a holding-circuit for the wire 82 from the hold-wire 71.

A circuit is next established from the lower end of the progression-wire 48, through a B6 back-contact 281, to a conductor 75, and thence through a B2 make-contact 282, which has just been closed, to a conductor 85 which is connected to the positive terminal of the B5 actuating-coil, the negative terminal of which is connected to the previously mentioned wire 104. The B5 switch closes its main-circuit contact B5, which shorts out more of the braking-resistance R5 in the common dynamic-braking circuit 203 of the traction-motors. At the same time, the B5 switch closes a make-contact 283 which establishes a holding-circuit for the conductor 85 from the hold-wire 71.

The energization of the braking-progression switch B5 opens its previously mentioned back-contacts 265 and 266, thus dropping out the switches B1 and B2, the main contacts of which are both short-circuited, now, by the main contact B5. The dropping-out of the B1 switch closes its lowermost back-contact 284, which completes a circuit from the conductor 75 to a B5 make-contact 285, and thence to a wire 86, which is connected to the positive terminal of the B6 coil, the negative terminal of which is connected to the wire 104. The B6 switch thus closes, and closes its main contact B6 which further shorts out some of the braking-resistor R5, thus still further reducing the effective braking-resistance in the dynamic-braking circuits. At the same time, the actuation of the B6 switch closes its make-contact 286, which establishes a holding-circuit for the wire 86 from the wire 71.

The actuation of the B6 switch also closes a make-contact 287, which connects the progression-wire 48 to the previously described conductor 72, thereby re-energizing the B2 switch, the negative circuit of which is now completed from the wire 102, through a B6 make-contact 288, to the wire 104.

It will be understood that all of these braking-progression operations are under the control of the limit-relay progression-circuit 46, which interrupts the progression whenever an excessive motor-current causes an opening of the current-relay back-contact 204, which is connected in the energizing circuit for said wire 46, thus interrupting the progression until the motor-current subsides to a desirable value.

The braking-circuit progression-wire 48 is also connected, through a G1 out-contact or back-contact 289, to the accelerating-resistance progression-wire 47.

After the second closure or actuation of the B2 switch, so that the B2 and B6 switches are now both closed, a circuit is made, from the accelerating - resistance progression - wire 47, through a B2 make-contact 290 and a B6 make-contact 291, to the previously described conductor 50, thus re-initiating the progression of the switches 1—2, 3—4, and 9—10, which progressively cut out the accelerating resistors R2 and R3 which are in the individual portions of the respective dynamic-braking circuits of the traction-motors, this progression being also under the same limit-relay control.

Ever since the actuation of the B5 switch, a B5 make-contact 292 has been energizing the accelerating-resistance hold-circuit 67 from the wire 31, in readiness for this progression of the accelerating-resistor switches S1 to S10. The braking-progression thus continues until substantially all of the braking-resistance is removed from the dynamic-braking circuit, thus resulting in the completion of the dynamic-braking operation, during which the speed of the car or train has been reduced from the initial speed at which the dynamic brake was applied, down to a low speed at which the dynamic brake fades out.

It has long been customary to specially calibrate the limit-relay CR, so that it drops out in response to desirable minimum armature-current values, during both acceleration and braking. To this end, I use the previously mentioned weight-responsive variable-load rheostat 205, and the braking-responsive rheostat 206, in separate energizing-circuits for the cumulative rate-coil RC of the limit-relay CR. As is customary, the weight-responsive rheostat 205 is in series with a make-contact 293 of the line-switch LS2, which is closed during the acceleration-progression control; while the braking-responsive rheostat 206 is in series with a make-contact 294 of the braking relay BR, which is closed during the dynamic-braking progression.

The operation of the simplified illustrated apparatus will be clear from the running comments which have been made during the progress of the description, as well as from the prior art which is represented by the Riley and Purifoy patent and the copending Riley application. A few words of added explanation, as to the features which are more particularly related to my novel relay-circuit parts, may, however, be helpful.

The novel control-features which are involved in my present invention relate to the circuits which are controlled by the back-contact 269 of the spotting relay SR. In previous control-systems as used, for some years, in the railway-equipment on which my present invention is an improvement, successive or repetitive closures of the SR back-contact 269, calling for more spotting-current, were used to cause the field-controller FC to make successive or repetitive swings in the direction toward the full-field position, and if these swings were violent enough to carry the field-controller into the F1 and F2 positions, as they commonly were, the SR back-contact 269 also effected an energization of the braking-resistor progress-line 48, which caused a progressive, and non-retroactive, reduction in the effective braking-resistance R5, during the spotting operation. Also, in this previously used spotting-control system, each progression of the field-controller FC toward the full-field position, in response to successive closures of the SR back-contact 269, was interrupted as soon as the field-controller left the F3 point, and reached the F2 point, in its travel toward the full-field position FF.

In accordance with my present invention, I altogether omit and prevent any braking-resistance progression during spotting, there being no connection between the spotting-relay back-contact 269 and the braking-resistor progression-wire 48, during spotting. I also remove the previously used limitation which prevented successive field-strengthening swings of the field-controller FC from reaching the full-field position (assuming that the low-current spotting-response, closing the SR back-contact 269, lasts long enough to be able to move the field-controller into its full-field position). Thus, my spotting-relay back-contact 269 is connected directly to the full-field wire 34 of the field-controller FC, with nothing to interrupt this connection except the spotting relay SR itself, and this contact is not connected at all to the braking-resistance progression-wire 48.

The result of my novel spotting-adjustments is that the spotting-control is effective solely on the field-controlling means FC, which controls the strength of the motor-fields, leaving the total maximum available resistance present in the dynamic-braking circuits of the traction-motors throughout the spotting period. In this manner, when dynamic braking is called for, by the energization of the full-brake wire 5, the full or maximum braking-circuit resistance is initially in circuit, so as to be available to cushion the first rush or buildup of the braking current, and the progressive reduction of this braking-circuit resistance is not started until full-field conditions are reached, under the control of the limit-relay CR, the circuit 46, the braking-relay interlock 273, and the full-field wire 34, after which the field-controller contact 276 continues the circuit, from the full-field wire 34 to the control-wire 49 and the braking-relay interlock 277, and thence to the braking-resistor progression-wire 48.

Another result of my novel spotting-control arrangement is that larger field-increasing steps are taken, in response to successive or repetitive closures of the back-contact 269 of the spotting relay SR, during the spotting operation. These large field-increasing steps give large sudden increments in the field-strength or flux of the traction-motors, followed quickly by considerably longer periods during which the field-shunts are connected in shunt relation to the field-windings SF1 and SF2. However, the notoriously sluggish flux-changing responses of a self-excited series-generator system cause the actual flux-values in the motors to die off relatively slowly, thus requiring an appreciable time, after each sudden field-strengthening increment, for the flux, and hence the armature-voltage and the spotting-current, to die down again to a value which will again cause the spotting relay SR to drop out and reclose its back-contact 269, thereby giving another boost or repetition, in the spotting-control field-increasing operation.

While I have described my invention, and explained its manner of operation, in connection with a particular simplified illustrative form of embodiment, I wish it to be understood that the efficacy of the invention is not affected by the addition of desired additional features or safeguards, or by the omission of undesired or unnecessary features, or by the substitution of equivalent or alternative forms of various means or elements for performing the essential element-functions which have been described and explained. I desire, therefore, that the appended claims shall be given the broadest construction consistent with their language.

I claim as my invention:

1. A motor-controlling assembly, including the combination, with a series-motor means to be controlled, said series-motor means including a motor-armature and a series field winding connected in series therewith; of: (a) a supply-circuit for the series-motor means; (b) a power-switch means, for establishing a power-circuit for energizing the series-motor means from the supply-circuit; (c) a braking-switch means, for establishing a dynamic-braking circuit which uses said series-motor means as an entirely self-excited series-generator means, said dynamic-braking circuit including a controllable braking-circuit resistance; (d) a field-controlling means for adjusting said series field winding toward a full-field condition and toward a short-field condition, respectively; (e) an accelerating control-means for controlling the closure of said power-switch means and, contingent upon such closure, controlling the acceleration of said series-motor means during power-circuit operating-conditions; (f) a spotting-current control-means, operating to close said braking-switch means in response to an opening of said power-switch means, said spotting-current control-means including a spotting-controlling limit-relay means which is energized to be responsive to conditions which accompany a lower-than-desired spotting-current in the dynamic-braking circuit, a means responsive whenever a low-current condition exists in said spotting-controlling limit-relay means, for causing said field-controlling means to adjust said series field winding toward full field while maintaining a maximum spotting value of braking-circuit resistance, and a means responsive whenever an acceptable-current condition exists in said spotting-controlling limit-relay means, for causing said field-controlling means to adjust said series field winding toward short field while still maintaining said maximum spotting value of braking-circuit resistance; and (g) a dynamic-braking control-means, operative to convert said spotting-current conditions into dynamic-braking conditions.

2. The invention as defined in claim 1, characterized by said dynamic-braking control-means (g) including a braking-controlling limit-relay means which is energized to be responsive to conditions which accompany a lower-than-desired braking-current in the dynamic-braking circuit, a first-adjustment braking-control means, responsive whenever a low-current condition exists in said braking-controlling limit-relay means, for first causing said field-controlling means to adjust said series field winding toward full field while maintaining a maximum braking value of braking-circuit resistance, and a final-adjustment braking-control means, subsequently operative, after full-field conditions have been established, and responsive whenever a low-current condition exists in said braking-controlling limit-relay means, for progressively reducing the value of the resistance in the braking-circuit, under the control of said braking-controlling limit-relay means.

3. The invention as defined in claim 2, characterized by said dynamic-braking control-means (g) further including a circuit-means arrangement whereby no retrogressive adjustment is made in either said field-controlling means or said braking-circuit resistance when an acceptable-current condition exists in said braking-controlling limit-relay means.

4. A motor-controlling assembly, including the combination, with a series-motor means to be controlled, said series-motor means including a motor-armature and a series field winding connected in series therewith; of: (a) a supply-circuit for the series-motor means; (b) a power-switch means, for establishing a power-circuit for energizing the series-motor means from the supply-circuit; (c) a braking-switch means, for establishing a dynamic-braking circuit which uses said series-motor means as an entirely self-excited series-generator means, said dynamic-braking circuit including a controllable braking-circuit resistance; (d) a multi-step field-controlling means for progressively adjusting said series field winding toward a full-field condition and toward a short-field condition, respectively; (e) an accelerating control-means for controlling the closure of said power-switch means and, contingent upon such closure, controlling the acceleration of said series-motor means during power-circuit operating-conditions; (f) a spotting-current control-means, operating to close said braking-switch means in response to an opening of said power-switch means, said spotting-current control-means including a spotting-controlling limit-relay means which is energized to be responsive to conditions which accompany a lower-than-desired spotting-current in the dynamic-braking circuit, a means responsive whenever a low-current condition exists in said spotting-controlling limit-relay means, for causing said field-controlling means to adjust said series field winding progressively toward full field while maintaining a maximum spotting value of braking-circuit resistance, and a means responsive whenever an acceptable-current condition exists in said spotting-controlling limit-relay means for causing said field-controlling means to adjust said series field winding progressively toward short field while still maintaining said maximum spotting value of braking-circuit resistance; and (g) a dynamic-braking control-means operative to convert said spotting-current conditions into dynamic-braking conditions.

5. The invention as defined in claim 4, characterized by said dynamic-braking control-means (g) including a braking-controlling limit-relay means which is energized to be responsive to conditions which accompany a lower-than-desired braking-current in the dynamic-braking circuit, a first-adjustment braking-control means, responsive whenever a low-current condition exists in said braking-controlling limit-relay means, for first causing said field-controlling means to adjust said series field winding toward full field while maintaining a maximum braking value of braking-circuit resistance, and a final-adjustment braking-control means, subsequently operative, after full-field conditions have been established, and responsive whenever a low-current condition exists in said braking-controlling limit-relay means, for progressively reducing the value of the resistance in the braking-circuit, under the control of said braking-controlling limit-relay means.

6. The invention as defined in claim 5, characterized by said dynamic-braking control-means (g) further including a circuit-means arrangement whereby no retrogressive adjustment is made in either said field-controlling means or said braking-circuit resistance when an acceptable-current condition exists in said braking-controlling limit-relay means.

7. A motor-controlling assembly, including the combination, with a series-motor means to be controlled, said series-motor means including a motor-armature and a series field winding connected in series therewith; of: (a) a supply-circuit for the series-motor means; (b) a power-switch means, for establishing a power-circuit for energizing the series-motor means from the supply-circuit; (c) a braking-switch means, for establishing a dynamic-braking circuit which uses said series-motor means as an entirely self-excited series-generator means, said dynamic-braking circuit including a controllable braking-circuit resistance; (d) a field-controlling means for adjusting said series field winding toward a full-field condition and toward a short-field condition, respectively; (e) an accelerating control-means for controlling the closure of said power-switch means and, contingent upon such closure, controlling the acceleration of said series-motor means during power-circuit operating-conditions; (f) a spotting-current control-means, operating to close said braking-switch means in response to an opening of said power-switch means, said spotting-current control-means including a spotting-controlling limit-relay means which is energized to be responsive to conditions which accompany a lower-than-desired spotting-current in the dynamic-braking circuit, a means responsive to repetitive momentary low-current responses of said spotting-controlling limit-relay means, during an extended continuance of the operation of said spotting-current control-means, for repetitively giving said field-controlling means momentary adjustments toward a full-field condition, in such strength that the increased field-strength will require a considerable time to die down again to a value which will produce a low-current response of said spotting-controlling limit-relay means, and means responsive to an acceptable-current condition of the spotting-controlling limit-relay means, for immediately adjusting said field-controlling means to move to its short-field condition, said braking-circuit resistance being maintained at a maximum value during the aforesaid operation of the spotting-current control-means; and (g) a dynamic-braking control-means, operative to convert said spotting-current conditions into dynamic-braking conditions.

8. The invention as defined in claim 7, characterized by said dynamic-braking control-means (g) including a braking-controlling limit-relay means which is energized to be responsive to conditions which accompany a lower-than-desired braking-current in the dynamic-braking circuit, a first-adjustment braking-control means, responsive whenever a low-current condition exists in said braking-controlling limit-relay means, for first causing said field-controlling means to adjust said series field winding toward full field while maintaining said maximum value of braking-circuit resistance, and a final-adjustment braking-control means, subsequently operative, after full-field conditions have been established, and responsive whenever a low-current condition exists in said braking-controlling limit-relay means, for progressively reducing the value of the resistance in the braking-circuit, under the control of said braking-controlling limit-relay means.

9. The invention as defined in claim 8, characterized by said dynamic-braking control-means (g) further including a circuit-means arrangement whereby no retrogressive adjustment is made in either said field-controlling means or said braking-circuit resistance when an acceptable-current condition exists in said braking-controlling limit-relay means.

10. A motor-controlling assembly, including the combination, with a series-motor means to be controlled, said series-motor means including a motor-armature and a series field winding connected in series therewith; of: (a) a supply-circuit for the series-motor means; (b) a power-switch means, for establishing a power-circuit for energizing the series-motor means from the supply-circuit; (c) a braking-switch means, for establishing a dynamic-braking circuit for the series-motor means, said dynamic-braking circuit including a controllable braking-circuit resistance; (d) a field-controlling means for adjusting said series field winding toward a full-field condition and toward a short-field condition, respectively; (e) a progressively operating acceleration-controlling means, for controlling the acceleration of the series-motor means during power-circuit operating-conditions, said acceleration-controlling means including a finally operating means for causing said field-controlling means to adjust said series field winding in a direction toward its short-field condition; (f) a spotting-controlling means, for controlling the spotting-adjustment of the dynamic-braking circuit during coasting conditions, said spotting-controlling means including a means for causing said field-controlling means to adjust said series field winding, either in a direction toward its full-field condition, or in a direction toward its short-field condition, according to spotting-current requirements, said braking-circuit resistance being maintained at a maximum value during said spotting-current adjustments; (g) a progressively operating braking-controlling means, for controlling the braking-adjustment of the dynamic-braking circuit during dynamic-braking conditions, said braking-controlling means including a means for causing said field-controlling means to adjust said series field winding to its full-field condition, and a means for progressively reducing the value of the resistance in the braking-circuit; and (h) controller-means for controlling the actuation of said power-switch means, said braking-switch means, and the several acceleration-controlling, spotting-controlling, and braking-controlling means.

11. The invention as defined in claim 10, characterized by said spotting-controlling means (f) including a means which is operative, during an extended spotting-operation, to repetitively produce field-strengthening impulses, alternated by field-weakening impulses, the field-strengthening impulses being of such magnitude that the increased field-strength will require a considerable time to die down again to a value which will require another field-strengthening impulse in order to maintain desirable spotting-current conditions.

12. The invention as defined in claim 10, characterized by said field-controlling means (d) being an adjustable means, and making progressive adjustments; and further characterized by said spotting-controlling means (f) being a progressively operating means, and causing the field-controlling means to make progressive adjustments.

13. The invention as defined in claim 12, characterized by said spotting-controlling means (f) including a means which is operative, during an extended spotting-operation, to repetitively produce field-strengthening impulses, alternated by field-weakening impulses, the field-strengthening impulses being of such magnitude that the increased field-strength will require a considerable time to die down again to a value which will require another field-strengthening impulse in order to maintain desirable spotting-current conditions.

WILLIAM L. BARCLAY, Jr.

No references cited.